UNITED STATES PATENT OFFICE.

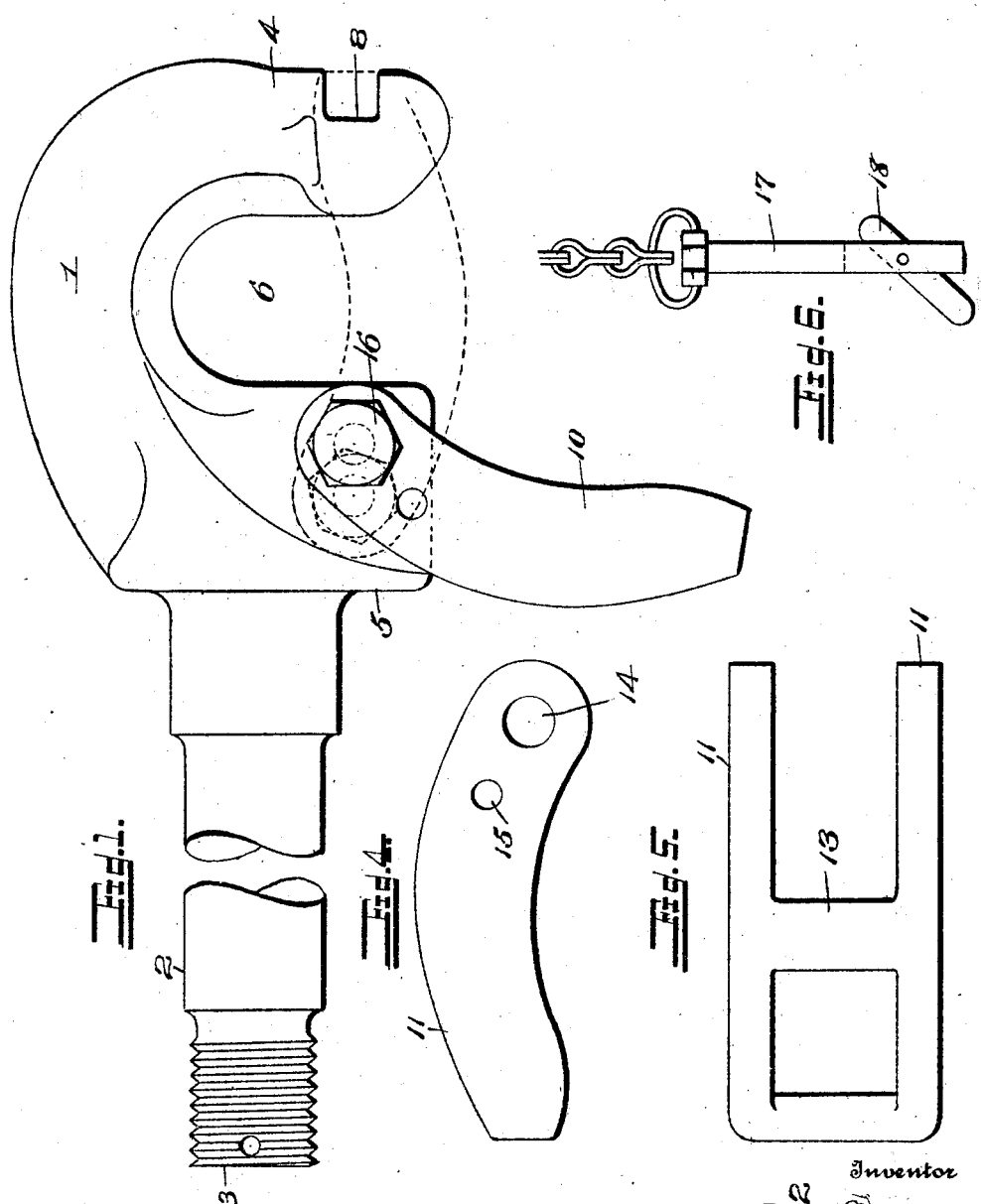

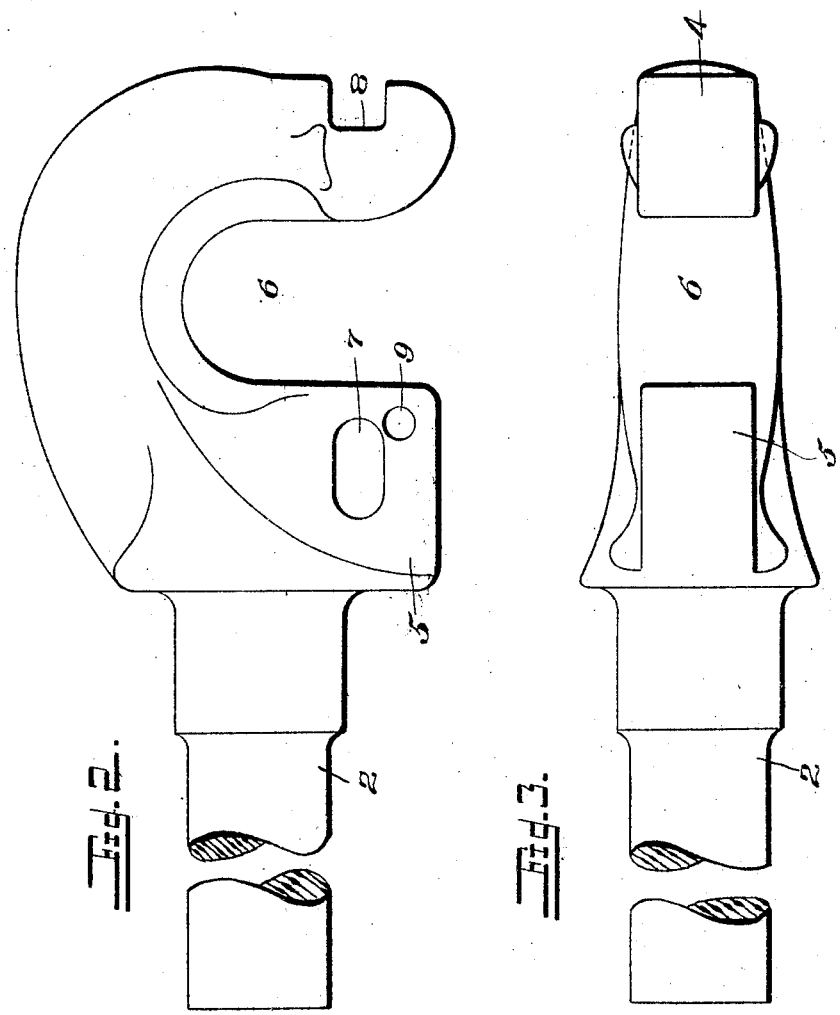

RUSSELL W. SPEECE, OF HONDO, TEXAS.

COUPLING.

1,379,133.  Specification of Letters Patent.  Patented May 24, 1921.

Application filed April 7, 1921. Serial No. 459,445.

(FILED UNDER THE ACT OF MARCH 3, 1883, 22 STAT. L., 625.)

*To all whom it may concern:*

Be it known that I, RUSSELL W. SPEECE, a citizen of the United States, and a resident of Hondo, in the county of Medina and State of Texas, have invented an Improved Coupling, of which the following is a specification.

The invention described herein may be used by the Government, or any of its officers or employees in prosecution of work for the Government, or by any other person in the United States, without payment of any royalty thereon.

The general object of this invention is to produce a coupling for connecting a trailer, limber or ammunition caisson to a motor vehicle; more particularly this invention is directed to a coupling, designed for military purposes, the prerequisites of which are simplicity, rapidity in attachment and detachment, strength and durability.

Another object of this invention is to provide a coupling of an extremely rugged nature having facilities for engaging and securely seating a coupling ring against rattling or accidental displacement irrespective of the angular relation of the interconnected vehicles.

Another object of this invention is to provide a coupling having a simple though effective means for locking the coupling ring in operative position, such means being mounted so as to permit immediate releasement of the ring when occasion requires.

With these and other objects in view this invention consists in certain novel details of construction, combination and arrangement of parts, to be more fully hereinafter described and claimed.

Briefly stated, this invention comprises a coupling head formed with suitable means for effecting its securement to a vehicle, a recess formed in the head adapted to receive a coupling ring, a latch plate pivotally connected to the head and operable to a position closing the recess and means for securely locking the latch plate in such position.

Referring to the accompanying drawings, in which corresponding parts are indicated by similar reference characters:

Figure 1 is a side elevation of the coupling forming the subject matter of this invention, the released position of the latch plate being shown in full; the closed or operative position thereof being shown in dotted outline.

Fig. 2 is a similar view with latch plate removed.

Fig. 3 is a top plan view, with latch plate removed.

Fig. 4 is a side elevation of the latch plate.

Fig. 5 is a top plan view thereof.

Fig. 6 is a front elevation of the locking pin with its auxiliary securing means.

When designing a coupling to be employed for military purposes, aside from durability and strength, there is another very important factor to be considered, namely ease and rapidity in attaching and detaching the coupling elements, as frequently field conditions are such that the trailer must be disconnected from the tractor or the like and placed in position with a minimum loss of time. It has been extremely difficult to obtain a design satisfactorily meeting these requirements and for this reason it was necessary to develop the special type of coupling forming the subject matter of this invention.

In the illustrated embodiment characterizing this invention there is shown a coupling 1 cast with a longitudinally extending shank 2 threaded at its extremity as at 3 for engagement with a suitable receiving member secured to the vehicle.

The coupling head 1 is designed with a bill 4 and heel 5 sufficiently separated to produce a U shaped recess 6 constituting a seat for a coupling ring or like element.

Heel 5 of the coupling is provided with a longitudinally extending elliptically shaped opening 7 formed in the plane of a notch 8 in the bill 4 located adjacent its upper end. Also in heel 5 in predetermined relation to opening 7 is a circular opening 9 the purpose of which will hereinafter appear.

A latch plate 10 is pivotally connected to the heel 5 for coöperation with the opposite bill 4. This plate comprises arcuately shaped, parallely arranged side pieces 11 interconnected at one end by a cross piece 12 and reinforced intermediate their extremities by a web 13. The side pieces 11 adjacent their free ends are formed with opposing and alining openings 14 and 15, the diameters of which correspond to the swivel bolt and locking pin respectively, employed with the latch plate when operatively positioned.

To swively connect the latch plate 10 to head 1 the free extremities of its side pieces are positioned on opposite sides of heel 5 with their openings 14 in alinement with the elliptical opening 7 in the heel. A bolt 16 is passed through the registering openings and secured in position by a suitable retaining nut threaded on its free end. A locking pin 17 extending through openings 15 in the latch plate and opening 7 in the heel 5, secures the latch plate in its coupling position. Locking pin 17 is held against accidental displacement by a keeper 18 swivelly mounted at its lower end.

Assuming a coupling ring to be seated in recess or seat 6 of the coupling head and the latch plate positioned as shown in full lines Fig. 4, to hold the coupling ring in its seat; latch plate 10 is lowered until cross piece 12 is in alinement with the notch 8. Plate 10 is then rectilinearly actuated in a rearward direction to the limit of opening 7. This movement positions cross piece 12 in the notch 8 of the bill and effects an interlocking connection between the latter and the latch plate. Locking pin 17 is then passed through alining openings 15 and 9 and its keeper 18 is sufficiently rotated to retain the pin in place.

From the preceding structural outline it becomes evident this invention offers a form of coupling which eliminates complicated features of the prevailing types, enables instant releasement of the coupling ring and affords the stability and durability essential to military usage.

Although in the foregoing certain elements have been defined as best adapted to perform the functions allotted to them, nevertheless it is to be understood that various minor changes as to structure may be resorted to, without departing from or sacrificing any of the principles of this invention.

Having defined my invention what I claim to be new and wish to secure by Letters Patent is:

1. A coupling comprising a head formed with a pair of opposing members spaced to produce a ring-receiving recess, a locking element pivoted to one member and operable to a position embracing the other, and co-acting means between said members and locking plate to permit longitudinal actuation of the latter and establish an interlocked relation between said plate and embraced member.

2. A coupling comprising a head involving spaced portions constituting a heel and bill, a locking element pivoted to the heel and operable to a horizontal position embracing the bill, and co-acting means between said portions and locking element to permit rearward longitudinal movement of the latter and establish an interlocked relation between said bill portion and locking element.

3. A coupling comprising a head involving horizontally spaced portions constituting a heel and bill, a locking element pivoted to the heel and operable to a horizontal position embracing the bill, and co-acting means between said portions and locking element to permit rearward longitudinal movement of the latter and establish an interlocked relation between said bill portion and locking element.

4. A coupling comprising a head involving horizontally spaced portions constituting a heel and bill the latter having therein a notch, a locking element pivoted to the heel portion and operable to a horizontal position overlying the notch, means affording rearward longitudinal movement of the locking element and so effect its engagement with the notch, and additional means permanently securing said locking element in its engaged position.

5. A coupling comprising a head involving horizontally spaced portions constituting a heel and bill, the latter having therein a notch, a locking element pivotally connected to the heel and embodying a cross piece, said element being operable to a horizontal position to dispose the cross piece immediately in advance of the notch, means affording rearward longitudinal movement of the locking element to seat the cross piece in said notch and effect an interlocked engagement between said bill and locking element, and additional means extending through the heel and co-acting with the locking element to permanently secure the latter in its locked position.

6. A coupling comprising a head involving horizontally spaced portions constituting a heel and bill, the latter having therein a notch, a locking element pivotally connected to the heel and embodying a cross piece, said element being operable to a horizontal position disposing the cross piece immediately in advance of the notch, means affording rearward longitudinal movement of the locking element to seat the cross piece in said notch and effect an interlocked engagement between said bill and locking element, and a locking pin extending through the heel and engaging the locking element, said pin having an auxiliary fastening device co-acting with the heel to prevent its displacement.

7. In a coupling the combination with a head having a bill and heel portion and an intermediate ring-receiving recess; of a latch plate swivelly secured to the heel portion and operable to a coupling position closing the ring-receiving recess, interlocking means on the latch plate and bill portion and additional means co-acting with the latch plate to retain the latter in its coupling position.

RUSSELL W. SPEECE.